(12) United States Patent
Huang

(10) Patent No.: US 11,400,622 B2
(45) Date of Patent: Aug. 2, 2022

(54) METHOD FOR MANUFACTURING RECYCLABLE INORGANIC PAPER

(71) Applicants: HO ASIA HUANG INTERNATIONAL CO., LTD., Taipei (TW); Chun Ming Huang, Taipei (TW)

(72) Inventor: Chun Ming Huang, Taipei (TW)

(73) Assignees: HO ASIA HUANG INTERNATIONAL CO., LTD., Taipei (TW); Chun Ming Huang, Taipei (TW)

(*) Notice: Subject to any disclaimer, the term of this patent is extended or adjusted under 35 U.S.C. 154(b) by 462 days.

(21) Appl. No.: 16/521,591

(22) Filed: Jul. 25, 2019

(65) Prior Publication Data

US 2021/0023743 A1    Jan. 28, 2021

(51) Int. Cl.
| | |
|---|---|
| *C08J 5/18* | (2006.01) |
| *B29C 43/00* | (2006.01) |
| *C08J 7/04* | (2020.01) |
| *C08K 3/40* | (2006.01) |
| *C08K 3/36* | (2006.01) |
| *B29C 43/24* | (2006.01) |
| *B29L 7/00* | (2006.01) |
| *B29K 67/00* | (2006.01) |
| *B29K 23/00* | (2006.01) |
| *B29K 509/08* | (2006.01) |
| *B29K 103/08* | (2006.01) |

(52) U.S. Cl.
CPC ............ *B29C 43/003* (2013.01); *B29C 43/24* (2013.01); *C08J 5/18* (2013.01); *C08J 7/04* (2013.01); *C08K 3/36* (2013.01); *C08K 3/40* (2013.01); *B29K 2023/06* (2013.01); *B29K 2023/12* (2013.01); *B29K 2067/046* (2013.01); *B29K 2103/08* (2013.01); *B29K 2509/08* (2013.01); *B29K 2995/006* (2013.01); *B29L 2007/008* (2013.01); *C08J 2323/06* (2013.01); *C08J 2323/12* (2013.01); *C08J 2367/04* (2013.01)

(58) Field of Classification Search
CPC ....... B29C 43/003; B29C 43/24; B29C 43/26; C08J 5/18; C08J 7/04; C08J 2323/06; C08J 2323/12; C08K 3/36; C08K 3/40; C08K 5/09; C08K 3/34; C08K 3/346; B29K 2023/06; B29K 2023/12; B29K 2067/046; B29K 2509/08; B29K 2995/006; B29L 2007/008
USPC ....................................................... 264/129
See application file for complete search history.

(56) References Cited

U.S. PATENT DOCUMENTS

| | | | | |
|---|---|---|---|---|
| 2012/0211189 A1* | 8/2012 | Huang | .................. | D21H 13/14 |
| | | | | 162/168.1 |
| 2013/0081770 A1* | 4/2013 | Huang | .................. | D21H 13/24 |
| | | | | 162/135 |
| 2021/0023742 A1* | 1/2021 | Huang | ...................... | C08J 5/18 |

* cited by examiner

*Primary Examiner* — Hannah J Pak
(74) *Attorney, Agent, or Firm* — Leong C. Lei

(57) ABSTRACT

A method is provided for manufacturing recyclable inorganic paper, which has a composition comprising 60-85 wt % mixture of natural inorganic mineral powders, inorganic glass powders, and sand powders, 5-40 wt % bonding agent of polypropylene (PP), and 1-5 wt % assisting agents, through the following steps: feeding and mixing of the constituents of the composition; stirring and mixing the composition; pressing to cause bi-directional extension of the composition so as to form a sheet; subjecting the sheet to operation of a high density squeezing machine for further mixing and pressing the sheet; reversely turning and shaping the sheet for further extension of the sheet; and continuous compression and extension of the sheet to induce further bi-directional extension of the sheet in both lateral and longitudinal direction and to control thickness of the sheet.

7 Claims, 10 Drawing Sheets

METHOD FOR MANUFACTURING RECYCLABLE INORGANIC PAPER

TECHNICAL FIELD OF THE INVENTION

The present invention generally relates to a method for manufacturing recyclable inorganic paper, which comprises a paper composition containing 60-85 wt % mixture of natural inorganic mineral powders, inorganic glass powders, and sand powder, 15-40 wt % bonding substance of polypropylene (PP) (which comprises a mixture of polylactic acid (PLA) or PP and polyethylene (PE)) and 1-5 wt % assisting agents and is made with a continuous compression molding process, whereby the paper so made is recyclable and only consumes PP, which is of a small fraction, in combustion so as not to generate high temperature, smoke, and toxic gases and to allow the residuals that are primarily the natural inorganic minerals that are of a major fraction to return to the earth and the nature after combustion.

DESCRIPTION OF THE PRIOR ART

Various types of synthetic paper are available in the international market and one that is made in the form of single-layer or multi-layer structure with a primary constituent of polypropylene (PP), as well as a filling substance of inorganic mineral powders, is conventionally made of a formula of thin-film plastic products. The manufacture is often done with a single layer or multiple layer co-extrusion through a flat nozzle of a shaping mold to form a thin sheet. The paper sheet, which is subjected to longitudinal stretching, receives additional sheets bonded to opposite surfaces thereof or laminated therewith, and is then further subjected lateral stretching. The synthetic paper so made is a multi-layer synthetic paper, which comprises a core layer that is stretched in two directions and surface layers that are stretched in only one direction.

The synthetic paper, either single-layered or multi-layered, which is made by subjecting a paper sheet first to longitudinal stretching and then lateral stretching, has a surface that shows bi-directional extendibility. The synthetic paper so made, although being advantageous in certain respects, is still of great difference from the performance of pulp paper. Disadvantages of the synthetic paper include: poor foldability, great difference between longitudinal tearability and lateral tearability, or excessive or insufficient tearability. Further, the synthetic paper that is made of a primary constituent of PP is not oxidized and decomposed in the nature in a short period of time after being disposed, so that it does not help in reducing secondary pollution. Further, the cost for manufacturing the synthetic paper is much higher than regular pulp paper. Due to such drawbacks, the synthetic paper has been of no appealing and attraction to the consumers.

SUMMARY OF THE INVENTION

In view of the previously discussed problems of the conventional technology, the present invention aims to provide a method for manufacturing recyclable inorganic paper in order to overcome the problem that a conventional synthetic paper that is made of a primary constituent of PP cannot be oxidized and decomposed in the nature in a short period of time after being disposed of and thus cannot reduce secondary pollution, as well as the problem that the conventional synthetic paper must be made with a much higher cost with the regular pulp paper.

An objective of the present invention is to provide a method for manufacturing recyclable inorganic paper, of which the composition comprises 60-85 wt % mixture of natural inorganic mineral powders, inorganic glass powders, and sand powders, 15-40 wt % bonding substance of polypropylene (PP) (which comprises a mixture of polylactic acid (PLA) or PP and polyethylene (PE)), and 1-5 wt % assisting agents and is made with a single-layer continuous compression molding process, which comprises the following steps:

Step one: constituents of the composition are automatically fed and mixed according to the ratios of the constituents;

Step two: continuous mixture and stirring are performed to realize uniform mixture of the compositional constituents;

Step three: combined pressing is performed to cause bi-directional extension of the compositional constituents to form a sheet in a bonded condition;

Step four: the sheet is passed through a high density squeezing machine for further mixing and pressing of the sheet;

Step five: a five-roller compression and extension machine is used to compress and extend the sheet so as to realize bi-directional extension in both lateral and longitudinal directions;

Step six: a cooling and shaping machine is used to perform continuous compression and extension on the sheet to induce further bi-directional extension in both lateral and longitudinal direction in order to control thickness of the sheet;

Step seven: a roll-winding machine is used to automatically roll the sheet up; and Step eight: a trimming machine is used to trim the sheet into a planar piece of paper of a desired size.

In this process, if the desired form of final paper product is a roll, then the eighth step can be omitted. The paper made in this way, after being used, can be recycled for regeneration and only the constituent of PP, which is of a minor fraction, will be consumed in combustion, so as not to generate high temperature, smoke, and toxicant gases and to allow the residuals that are primarily the natural inorganic minerals, the inorganic glass powders, and the sand powders that are of a major fraction to return to the earth and the nature after combustion, making the present invention perfectly fit to the requirement of environmental protection.

Another objective of the present invention is to provide a method for manufacturing recyclable inorganic paper, which has a ratio between longitudinal tensile strength and lateral tensile strength of 1:1 to 1:2, or 2:1 to 1:1, or 1:2 to 1:3 and a ratio between longitudinal tear strength and lateral tear strength of 1:1 to 1:2, or 2:1 to 1:1, or 1:2 to 1:3, and comprises a primary constituent of at most 85 wt % natural inorganic mineral powders (including calcium carbonate (light calcium carbonate, heavy calcium carbonate, colloid calcium carbonate, active heavy calcium carbonate), pulverized coal powder, calcium sulfate, barium sulfate, kaolin, mica powder, zinc oxide, dolomite powder, calcium silicate, glass fiber, hollow micro-particle of glass, silica powder, chalk powder, talcum powder, pigment, titanium dioxide, silicon dioxide, bentonite, clay, diatomite, and mixtures thereof, being subjected to calcination or not), inorganic glass powders, which is made of disposed glass articles, especially glass articles made of glass, so that it has the features of containing a single, generally pure constituent without major impurity and thus, after the glass articles are ground to fine glass powders as a raw material, it also contains a single, generally pure constituent, this being a readily-controllable raw material and easy access of the material and helping handle environmental protection issue of disposed glass articles, and sand powders, which are sand particles that are available from deserts and subjected to grinding into a powdery form, together with 15-40 wt % bonding substance of PP (including a combination of PP and low density PE, ethylene vinyl acetate (EVA), and polylactic acid (PLA)), and 1-5 wt % assisting agents (including solid softening agent, activating agent, promoter, aging prevention agent, scorch prevention agent, bonding agent, heat resisting agent, initiator agent, polymerization catalyst, dispersing agent, emulsifying agent, plasticizer, heat/light stabilizer, fire retardant, mold release agent, decomposable substances (which can be starch (such as soybean powder, corn meal, casaval meal and the likes)), chitin, polycaprolactone, modified aromatic polyesters, and the likes).

A further objective of the present invention is to provide a method for manufacturing recyclable inorganic paper, which has a composition comprising 60-85 wt % natural inorganic mineral powders, inorganic glass powders, and sand powders, 15-40 wt % bonding agent of PP (which comprises a mixture of PLA or PP and PE) and 1-5 wt % assisting agents and which shows improved characteristics over the regular pulp paper in respect of foldability, stiffness, levelability, opaqueness, glossiness, and writability of ball pen, pencil, and water-based pens, and printing resolution, and has longitudinal and lateral tear strengths and tensile strength close to the regular pulp paper, and also shows the characteristics of water resistance, improved strength, perforation resistance, wear resistances, fold resistance, and vermin-eating resistance.

Yet a further objective of the present invention is to provide a method for manufacturing recyclable inorganic paper, which has a composition comprising 60-85 wt % natural inorganic mineral powders, inorganic glass powders, and sand powders, 15-40 wt % bonding agent of PP (which comprises a mixture of PLA or PP and PE) and 1-5 wt % assisting agents, whereby depending upon the assisting agents used, the paper can be biodegradable, which is decomposed in the nature by microorganisms into carbon dioxide and water, or photo-degradable, which can be decomposed by exposure to ultraviolet components contained in the sun light to have main chains of large molecules thereof broken, or oxidation decomposable, which is decomposed through oxidation of the constituent materials thereof with oxygen to form oxides. Thus, the disposed paper can be returned to the earth, generates no toxicant gas or cause water pollution, so as to completely meet the requirement for environmental protection.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
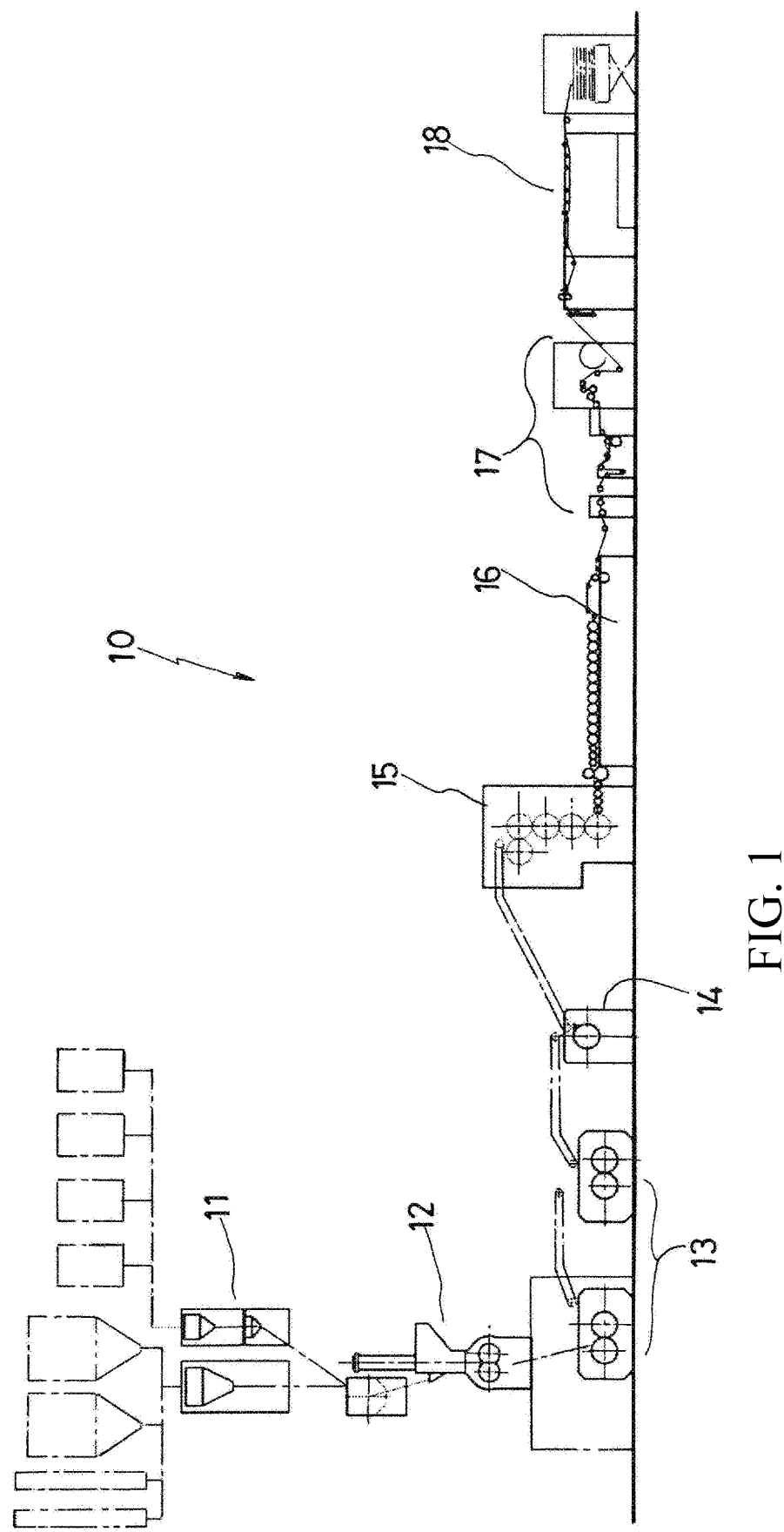
FIG. 1 is a schematic view showing a compression and extension paper making device according to the present invention.
Figure 2:
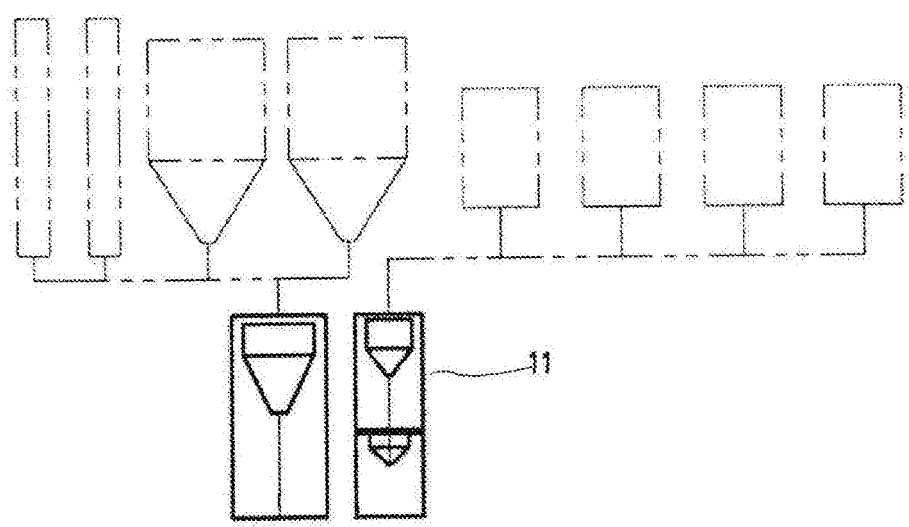
FIG. 2 is a schematic view showing an automatic metering machine according to the present invention.
Figure 3:
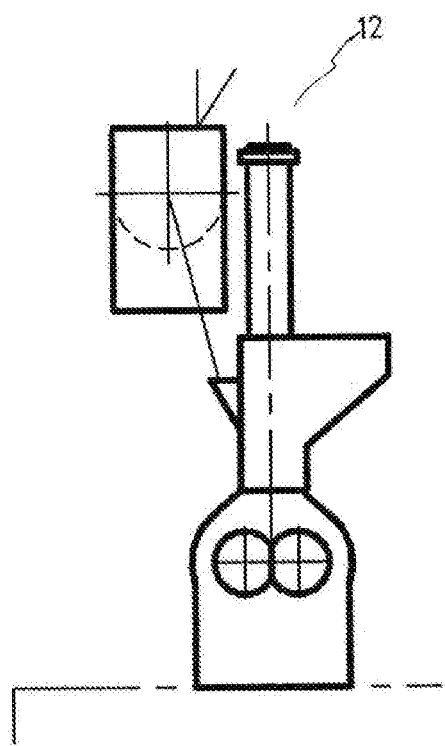
FIG. 3 is a schematic view showing an automatic stirring and mixing machine according to the present invention.
Figure 4:
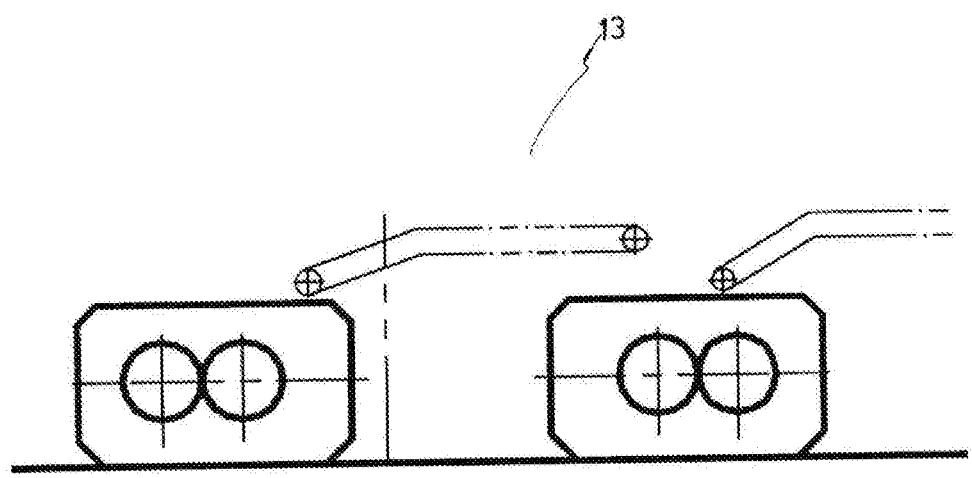
FIG. 4 is a schematic view showing a combined sheet forming machine according to the present invention.
Figure 5:
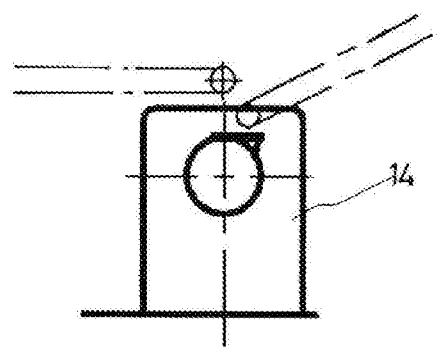
FIG. 5 is a schematic view showing a high-density squeezing machine according to the present invention.
Figure 6:
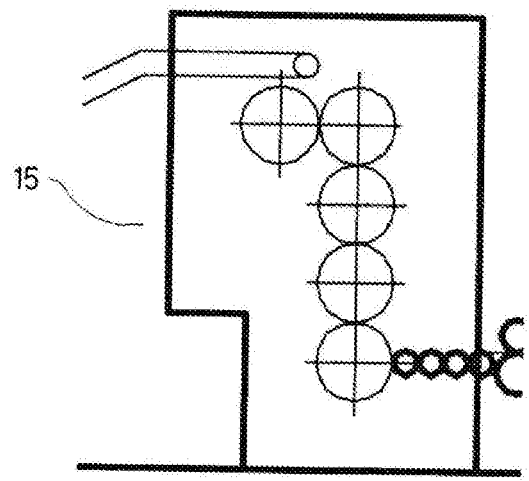
FIG. 6 is a schematic view showing a five-roller compression and extension machine according to the present invention.
Figure 7:
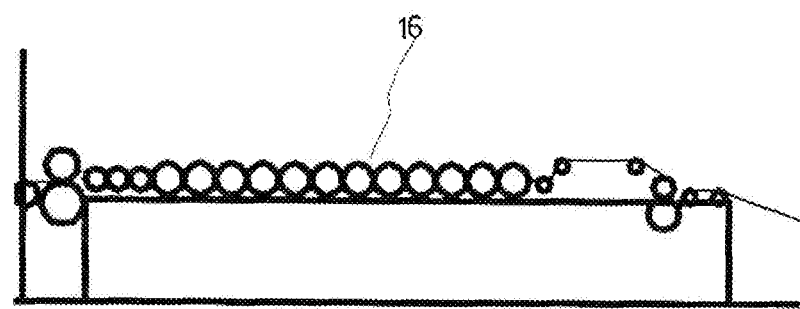
FIG. 7 is a schematic view showing a cooling and shaping machine according to the present invention.
Figure 8:
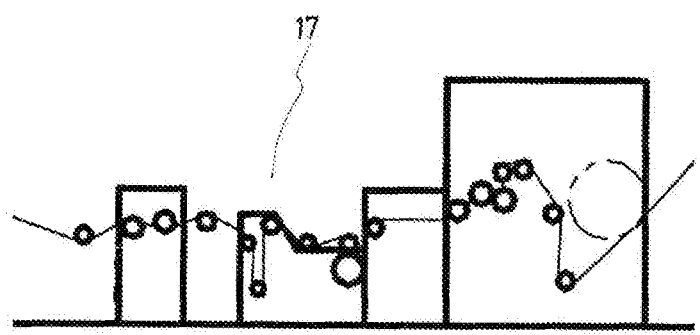
FIG. 8 is a schematic view showing an automatic roll-winding machine according to the present invention.
Figure 9:
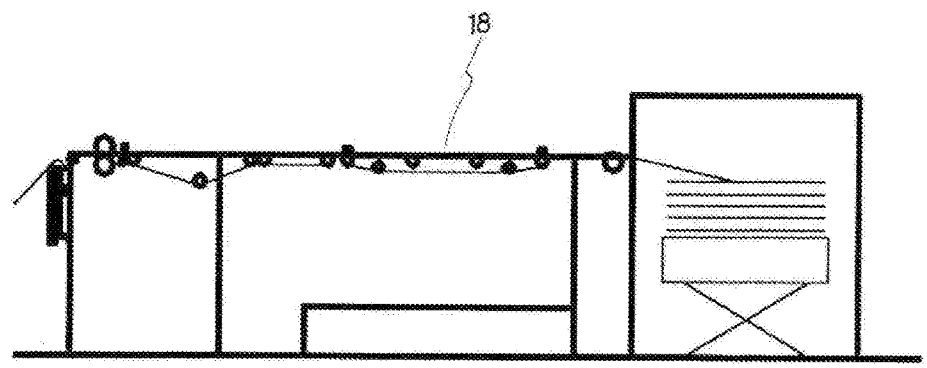
FIG. 9 is a schematic view showing a trimming machine according to the present invention.

Referring to FIGS. 1-9, the present invention provides a method for manufacturing recyclable inorganic paper, which has a composition comprising 60-85 wt % natural inorganic mineral powders (such as calcium carbonate (including light calcium carbonate, heavy calcium carbonate, colloid calcium carbonate, active heavy calcium carbonate), pulverized coal powder, calcium sulfate, barium sulfate, kaolin, mica powder, zinc oxide, dolomite powder, calcium silicate, glass fiber, hollow micro-particle of glass, silica powder, chalk powder, talcum powder, pigment, titanium dioxide, silicon dioxide, bentonite, clay, diatomite, and mixtures thereof (which is or is not subjected to calcination); inorganic glass powders, which are subjected to grinding to be in a powdery form as a primary constituent that can be directly deposited into a compression and extension paper making device 10 (trimmed residuals or scraps being also directly fed back to the machine for compression and extension, so that no waste may be generated); and which are sand particles that are available from deserts and subjected to grinding into a powdery form; 15-40 wt % bonding agent of polypropylene (PP) (which comprises a mixture of polylactic acid (PLA) or PP and polyethylene (PE)); and 1-5 wt % assisting agents. The material of PP used may comprise a combination of PP and low density PE, ethylene vinyl acetate (EVA), and PLA. The assisting agents may include one or more of coupling agent, slipping agent (dispersing agent), anti-static agent, solid softening agent, activating agent, promoter, aging prevention agent, scorch prevention agent, bonding agent, heat resisting agent, initiator agent, polymerization catalyst, dispersing agent, emulsifying agent, plasticizer, heat/light stabilizer, fire retardant, and mold release agent. The coupling agent may include di(dioctyl phosphate)ethylene and/or β-(3,4-epoxycyclohexyl)ethyltrimethoxysilane). The slipping agent may include gelatin and/or methyl cellulose. The anti-static agent may include octadecyldiethanolamine.

The composition of the inorganic paper does not need to be processed for formation of raw material mother particles and, instead, can be directly deposited into a compression and extension paper making device 10. (Trimmed residuals may also be directly fed back to the machine for compression and extension, so that no waste may be generated.) The compression and extension paper making device 10 comprises an automatic metering machine 11, an automatic stirring and mixing machine 12, a combined sheet forming machine 13, a high-density squeezing machine 14, a five-roller compression and extension machine 15, a cooling and shaping machine 16, an automatic roll-winding machine 17, and a trimming machine 18. The manufacturing method comprises the following steps:

Step one: the automatic metering machine 11 performs automatic feeding and mixing of the constituents of the composition according to the ratios of the constituents to be then supplied to the automatic stirring and mixing machine 12;

Step two: the automatic stirring and mixing machine 12 performs continuous mixture and stirring of the composition to realize uniform mixture of the compositional constituents;

Step three: the well mixed composition is then directly fed to the combined sheet forming machine 13 to be subjected to combined pressing so as to cause bi-directional extension of the compositional constituents and uniform rubbing and kneading to form a sheet of the compositional constituents in a bonded condition;

Step four: the uniformly rubbed and kneaded sheet is passed through the high density squeezing machine 14 for further mixing and pressing the sheet, so as to provide the sheet with proper hardness and proper tension;

Step five: the five-roller compression and extension machine 15 is used for reversely turning and shaping the sheet and to realize bi-directional extension of the sheet in both lateral and longitudinal directions;

Step six: the cooling and shaping machine 16 is used to perform continuous compression and extension on the sheet to induce further bi-directional extension of the sheet in both lateral and longitudinal direction and to control thickness of the sheet;

Step seven: the roll-winding machine 17 is used to automatically roll the paper sheet up in the form of a paper roll; and Step eight: the trimming machine 18 is used to trim the paper sheet into a planar piece of paper of a desired size.

As such, the composition of paper according to the present invention comprises 60-85 wt % natural inorganic mineral powders, inorganic glass powders, and sand powders, 15-40 wt % bonding agent of PP (which comprises a mixture of PLA or PP and PE) and 1-5 wt % assisting agents, whereby depending upon the assisting agents used, the paper can be biodegradable, which is decomposed in the nature by microorganisms into carbon dioxide and water, or photo-degradable, which can be decomposed by exposure to ultra-violet components contained in the sun light to have main chains of large molecules thereof broken, or oxidation decomposable, which is decomposed through oxidation of the constituent materials thereof with oxygen to form oxides. Thus, any disposed paper can be recycled for regeneration and only the constituent of PP, which is of a minor fraction, will be consumed in combustion, so as not to generate high temperature, smoke, and toxicant gases and to allow the residuals that are primarily the natural inorganic minerals, the inorganic glass powders, and the sand powders that are of a major fraction to return to the earth and the nature after combustion, making the present invention perfectly fit to the requirement of environmental protection. Further, the composition of the inorganic paper according to the present invention can be automatically fed and metered according to the ratios of the constituent components thereof and requiring no formation of particles, which leads to a reduction of cost for mixture of the components and formation of raw material mother particles.

The five-roller compression and extension machine 15 used in the fifth step is operated by employing high temperature compression and extension and the temperature employed can be adjusted according to the characteristics of the composition formula of the desired inorganic paper so as to effectively realize melting, mixture, and bi-directional extension of the composition of inorganic paper. The cooling and shaping machine 16 used in the sixth step is adjustable for compression time according to the desired thickness and product property of the inorganic paper. In the previous process, if the desired form of final paper product is a paper roll, then the eighth step can be omitted.

In an embodiment of the method for manufacturing recyclable inorganic paper according to the present invention, the composition of the paper comprises 73 wt % calcium carbonate, inorganic glass powder, and sand powder, 17 wt % PP, 7 wt % low density PE, 1 wt % coupling agent OL-T951, 1 wt % stearic acid, 1 wt % other assisting agents. All these constituents adding together are 100 wt %, and are subjected to mixture, squeezing, and compounding, and then deposited into the compression and extension paper making device 10 for manufacture of recyclable paper sheets of a thickness of 0.1 mm according to the desired product thickness.

In another embodiment of the method for manufacturing recyclable inorganic paper according to the present invention, the composition of the paper comprises 72 wt % talcum powder, inorganic glass powder, and sand powder, 17 wt % PP, 8 wt % low density PE, 1 wt % coupling agent NDZ-101, 1 wt % calcium stearate, 1 wt % other assisting agents.

The above constituents adding together are 100 wt %, and are subjected to mixture, squeezing, and compounding, and then deposited into the compression and extension paper making device 10 for manufacture of recyclable paper sheets of a thickness of 0.2 mm according to the desired product thickness.

In a further embodiment of the method for manufacturing recyclable inorganic paper according to the present invention, the composition of the paper comprises 70 wt % nanometer calcium carbonate, inorganic glass powder, and sand powder, 15 wt % PP, 5 wt % low density PE, 5 wt % dispersing agent, 1 wt % calcium stearate, 4 wt % other assisting agents.

All these constituents adding together are 100 wt %, and are subjected to mixture, squeezing, and compounding, and then deposited into the compression and extension paper making device for manufacture of recyclable paper sheets of a thickness of 0.3 mm according to the desired product thickness.

Further, according to paper thickness and property, the inorganic paper made according to the method of the present invention can be used, after further and proper processing, to make monthly calendar, almanac, hanging scroll, map, notebook, instruction leaflet, business log, letter paper, book, commercial marks, poster, label, various hand-carrying bags, wrapping paper, art and craft material, wall paper, surface cover for woven bag, release paper, heat-sealing package bag, backing adhesive label paper, surface bonding material, atlas, self-adhesive mark, surface bonding material for plastic tablet, shopping bag, various hand bags, wall paper, newspaper and loose leaf paper, notebook, book, desk calendar, envelope, shinning paper, instruction leaflet, education material, festival and celebration card, three-dimensional cards, playing cards, business card, name plate, hanging card, painting, book cover, various package boxes, shoe box, cigarette box, tea leaf box, meal pad, window curtain, hanging plate, frozen foodstuff plate for food package, disposable dining utensil, meal box, sun shade for automobile, art lantern decoration, frozen commodity indication plate for convenience stores, three-dimensional paper sculpture, coupon, scoring card, product catalog, cup coaster, plastic floor tile, large-sized advertisement, lantern box advertisement, as well as paper for culture purposes, such as paper for culture purposes, paper for printing, paper for writing, and paper for computer character making, and paper for decoration purposes and paper for packaging purposes. The paper can be used directly and further processing is performed to make a coating on a surface of the paper to form a frosted surface or a shining surface.

Figure 10:
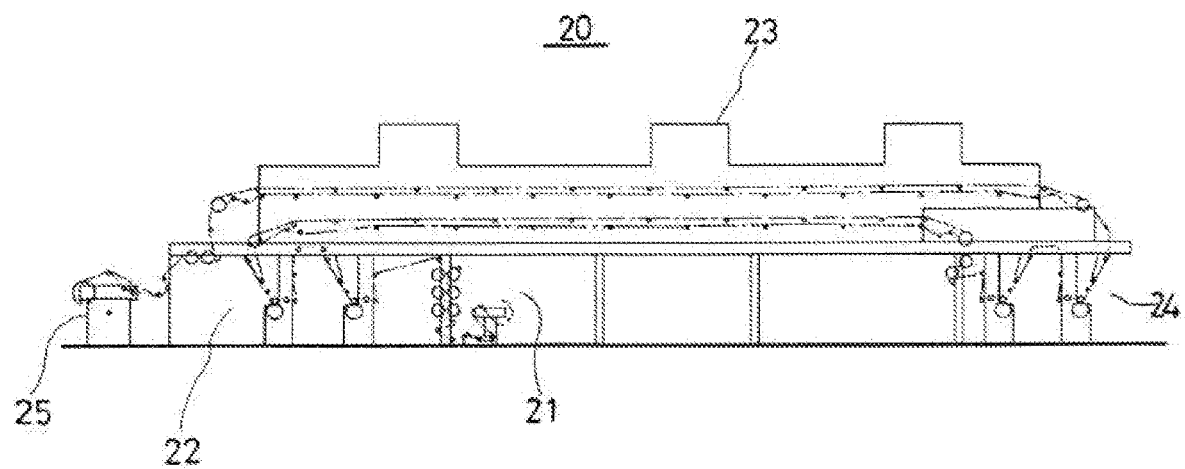
FIG. 10 is a schematic view showing a dual-side coating machine according to the present invention.
Figure 11:
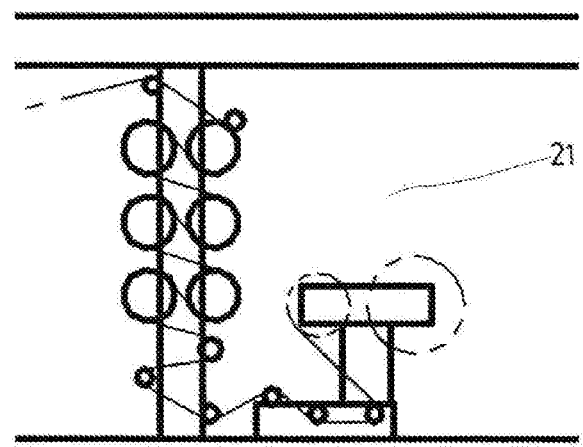
FIG. 11 is a schematic view showing an automatic leveling machine according to the present invention.
Figure 12:
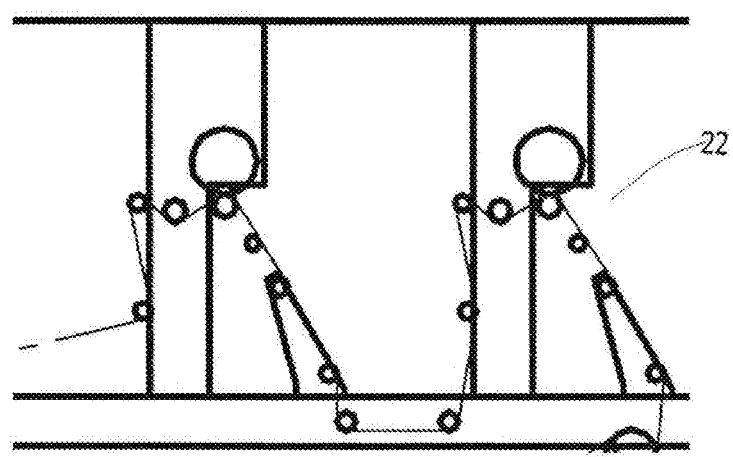
FIG. 12 is a schematic view showing a front surface coating machine according to the present invention.
Figure 13:
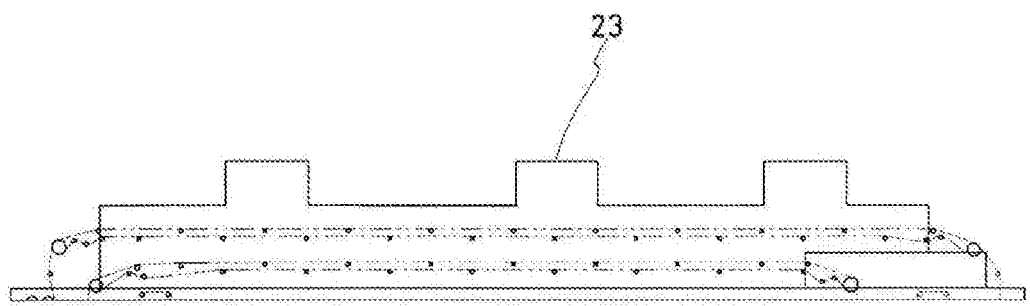
FIG. 13 is a schematic view showing a dry type baking oven according to the present invention.
Figure 14:
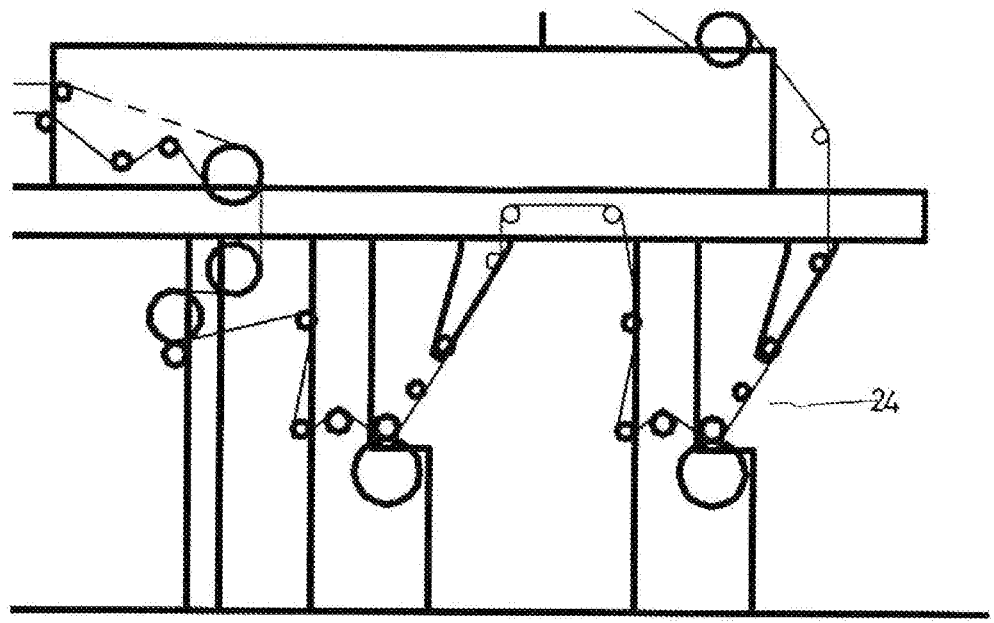
FIG. 14 is a schematic view showing a back surface coating machine according to the present invention.
Figure 15:
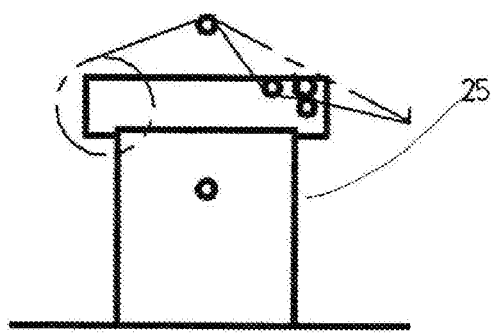
FIG. 15 is a schematic view showing a paper rolling machine according to the present invention.

Referring to FIGS. 10-15, the recyclable inorganic paper according to the present invention can be processed to form a coating layer on a surface thereof, and the coating can be formed of a water-based solution or an oil-based solution. For the case where a water-based solution is used to form the coating, the composition of the water-based coating solution may comprise acrylic resin, isoprophy alcohol, polyvinyl alcohol, clay, anti-static agent, 28% ammonia liquor, pure water, and vinyl acetate. A dual-side coating machine 20 is used to deposit a non-coated paper sheet into an automatic leveling machine 21 to have the sheet dragged and leveled for subsequent performance of corona treatment, whereby the two surfaces of the paper sheet, after being treated with high voltage discharging, form a plurality of tiny voids, which help improving bonding force for the coating applied to the surface (the surface treatment being selectively thermal fusion coating, fluent spraying, flame spraying, plasma spraying, and electrostatic spraying). The paper sheet is conveyed to a front surface coating machine 22 for initial coating, and then the paper sheet is conveyed to a dry type baking oven 23 to have the surfaces thereof dried for subsequent coating on the opposite surface. A back surface coating machine 24 uses a plurality of spraying nozzles to control the amount of coating solution sprayed and realize coating on the opposite surface. The paper sheet is then conveyed to the dry type baking oven 23 to dry the coated surface, whereby under the condition of being heated, the coated surface of the paper sheet can be quickly dried and shows a shining face on the paper surface. Further, for frosting treatment of the coated surface of the paper sheet, a frosting roller is employed to compress the paper sheet so that the dried smooth coated surface of the paper sheet is converted into a frosted surface. Then, a paper rolling machine 25 is used to roll up the coated paper sheet into a paper roll.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A method for manufacturing recyclable inorganic paper, which has a composition comprising 60-85 wt % mixture of natural inorganic mineral powders, inorganic glass powders, and sand powder, 5-40 wt % bonding agent of polypropylene (PP), and 1-5 wt % assisting agents, wherein the composition of the paper does not need to be processed for formation of raw material mother particles and is directly deposited into a compression and extension paper making device, which comprises an automatic metering machine, an automatic stirring and mixing machine, a combined sheet forming machine, a high-density squeezing machine, a five-roller compression and extension machine, and a cooling and shaping machine, the method comprising the following steps:
    step one: the automatic metering machine performs automatic feeding and mixing of the constituents of the composition according to the ratios of the constituents to be supplied to the automatic stirring and mixing machine;
    step two: the automatic stirring and mixing machine performs continuous mixture and stirring of the composition to realize uniform mixture of the compositional constituents to obtain mixed composition;
    step three: the mixed composition is then directly fed to the combined sheet forming machine to be subjected to combined pressing so as to cause bi-directional extension of the compositional constituents and uniform rubbing and kneading to have the compositional constituents bonded in the form of a uniformly rubbed and kneaded sheet;
    step four: the uniformly rubbed and kneaded sheet is passed through the high density squeezing machine for further mixing and pressing the sheet;
    step five: the five-roller compression and extension machine is used for reversely turning and shaping the sheet and to realize bi-directional extension of the sheet in both lateral and longitudinal directions; and
    step six: the cooling and shaping machine is used to perform continuous compression and extension on the sheet to induce further bi-directional extension of the sheet in both lateral and longitudinal directions and to control a thickness of the sheet.

2. The method according to claim 1, wherein the compression and extension paper making device further comprises an automatic roll-winding machine and a trimming machine, wherein the sheet formed in step six is wound by using the automatic roll-winding machine and then trimmed to a planar piece of paper by the trimming machine.

3. The method according to claim 1, wherein the cooling and shaping machine of step six is adjustable for compression time according to the thickness of the paper.

4. The method according to claim 1, wherein the sheet formed in step six is further subjected to surface coating of an oil-based coating solution.

5. The method according to claim 1, wherein the sheet formed in step six is further subjected to surface coating of a water-based coating solution through use of a dual-side coating machine to deposit a non-coated paper sheet into an automatic leveling machine to have the sheet dragged and leveled for subsequent performance of corona treatment, wherein the two surfaces of the paper sheet, after being treated with high voltage discharging, form a plurality of voids, which help improving a bonding force for the coating applied to the surface; the paper sheet is conveyed to a front surface coating machine for initial coating, and then the paper sheet is conveyed to a dry baking oven to have the surfaces thereof dried for subsequent coating on the opposite surface; a back surface coating machine uses a plurality of spraying nozzles to control an amount of the coating solution sprayed and realize coating on the opposite surface; and the paper sheet is then conveyed to the dry baking oven to dry the coated surface, whereby under the condition of being heated, the coated surface of the paper sheet is dried and shows a shining face on the paper surface.

6. The method according to claim 1, wherein the bonding agent of polypropylene comprises a mixture of polypropylene, polyethylene, and polylactic acid.

7. The method according to claim 5, wherein the surface coating is carried out by applying one of thermal fusion coating, fluent spraying, flame spraying, plasma spraying, and electrostatic spraying.

\* \* \* \* \*